UNITED STATES PATENT OFFICE.

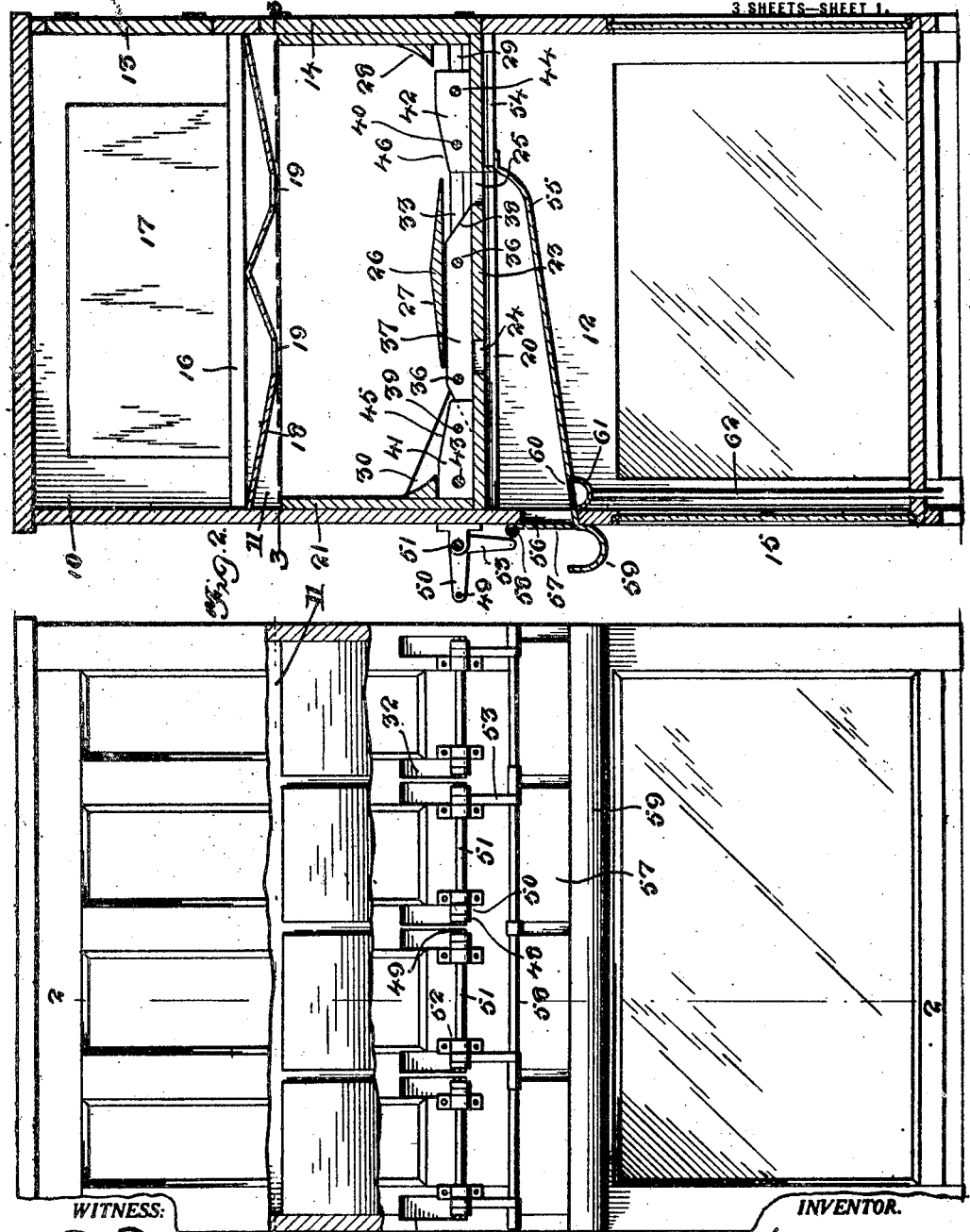

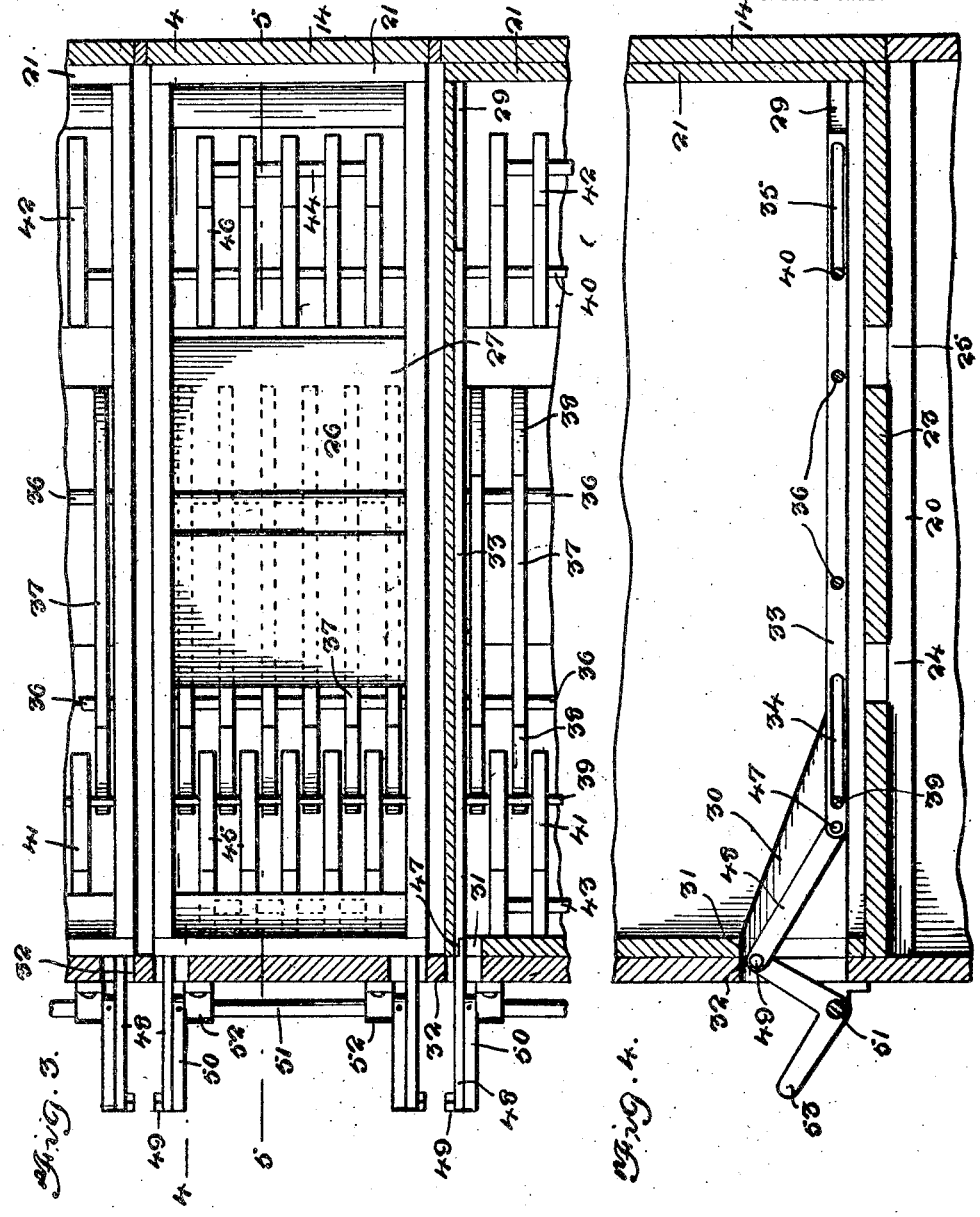

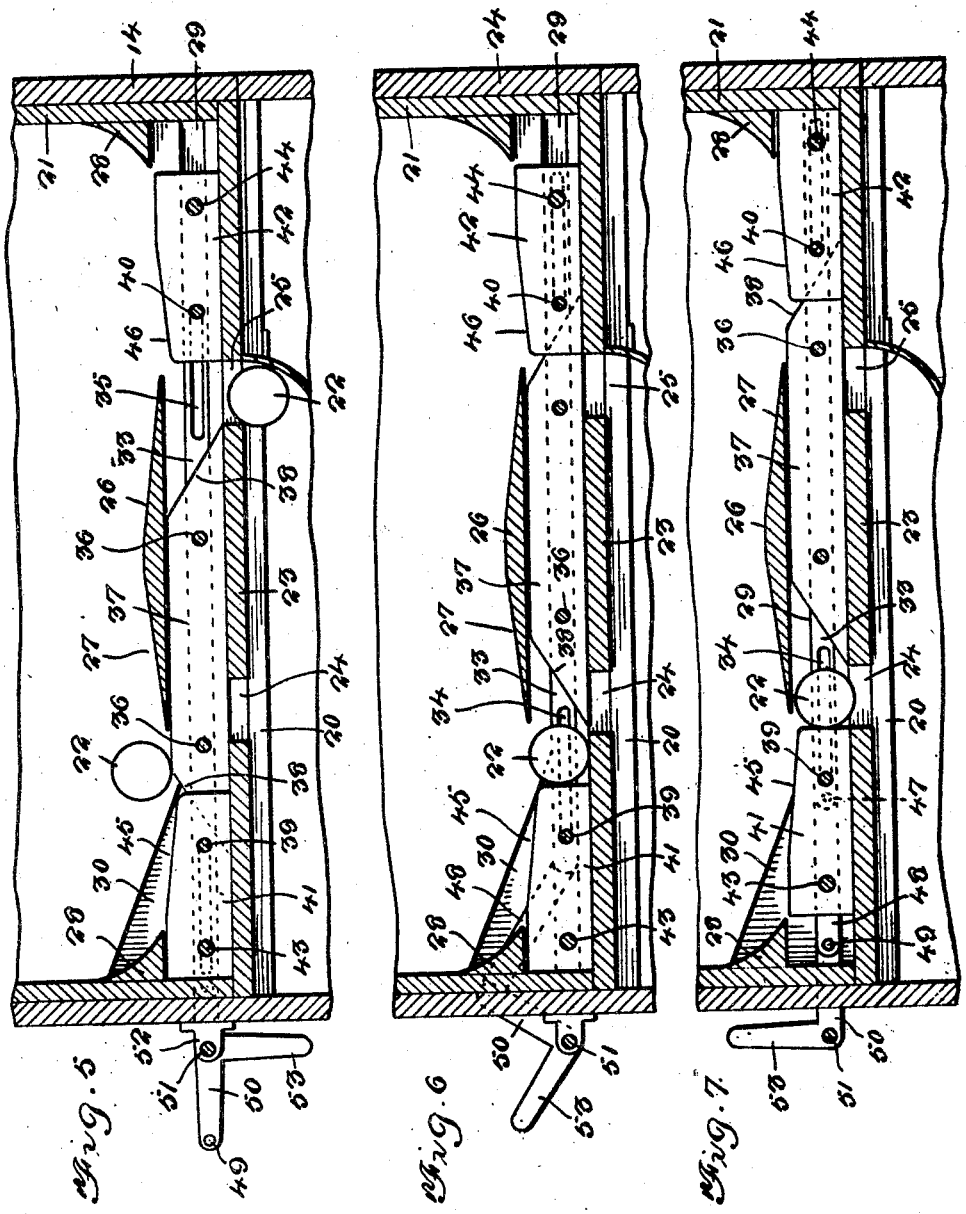

FRANK F. GILLIAM, OF GREENVILLE, SOUTH CAROLINA.

BOTTLE-DISPENSING APPARATUS.

1,330,799.     Specification of Letters Patent.     Patented Feb. 17, 1920.

Application filed March 28, 1919. Serial No. 285,756.

*To all whom it may concern:*

Be it known that I, FRANK F. GILLIAM, a citizen of the United States, residing at Greenville, in the county of Greenville and State of South Carolina, have invented new and useful Improvements in Bottle-Dispensing Apparatus, of which the following is a specification.

This invention has reference to a bottle dispensing apparatus.

The primary object of the invention is to produce, in an apparatus of this character, simple means whereby bottled goods will be delivered singly in a cooled condition.

A further object of the invention is to produce an apparatus of this character including a casing divided into any desired number of compartments, certain of them containing refrigerating means, others containing bottled goods to be dispensed and the remaining compartments being devised to receive any character of goods or merchandise desired to be maintained in a cool condition, the cold air from the refrigerating compartments circulating to all of the remaining compartments, and the bottled goods containing compartments being provided with means whereby the bottles therein will be singly delivered therefrom to a suitable receiving trough on the outer face of the casing.

It is a further object of the invention to produce a bottle dispensing apparatus comprising a casing divided into any desired number of compartments, certain of which are adapted to receive bottled goods of varying characters, others serving as refrigerating and cooling compartments, the bottle compartments supporting therein box-like cases in which the bottled goods are arranged, the bottom wall of each of the cases being provided with two bottle outlets normally covered by a bottle directing plate, while between the said plate and the bottom of the case is a longitudinally movable combined agitating and discharge controlled device which, when moved in one direction will bring one of the bottles to a discharge position through one of the openings and cover the other opening, and when moved to another position will uncover the second opening after bringing a second bottle to discharge position with respect to said opening and cover the first mentioned opening, the discharged bottles being directed by a suitable chute to a delivery trough arranged on the outer face of the casing.

It is a still further object of the invention to produce a bottle dispensing apparatus having means operated by a lever for singly delivering bottles when the lever is swung to either of two positions.

It is a still further object of the invention to produce a bottle delivery apparatus including a suitable casing divided into compartments and having means for delivering a circulation of cooled air thereto, certain of the compartments having supporting means for cases containing horizontally disposed bottled goods and the said cases having spaced bottle outlets at the bottoms thereof, and provided with means for directing the bottles toward said outlets, while in each of the cases is arranged longitudinally movable means designed, when actuated, to agitate the bottles and to direct the same singly and alternately to the respective outlets and onto directing chutes leading to the front of the casing and to a delivery trough, suitable doors normally closing the outlet mouth of the troughs, suitable means being arranged upon the outer face of the casing for operating the bottle agitating and discharge means, while all of the compartments in the casing are independent one of the other and are each normally closed by a suitable door therefor.

Other objects and advantages will present themselves as the nature of the invention is better understood, reference being had to the accompanying drawings forming part of this specification, in which there is illustrated a simple and satisfactory embodiment of the invention reduced to practice, it being understood that the nature of the device is such as to render the same susceptible to various changes and modifications, all of them, however, falling within the scope of what is claimed.

In the drawings:

Figure 1 is a front elevation of my improvment.

Fig. 2 is a sectional view approximately on the line 2—2 of Fig. 1.

Fig. 3 is an enlarged detailed horizontal sectional view approximately on the line 3—3 of Fig. 2.

Fig. 4 is a sectional view approximately on the line 4—4 of Fig. 3.

Fig. 5 is a sectional view approximately on the line 5—5 of Fig. 3, the combined agitating and discharge controlled means being operated to bring a bottle to discharge position through one of the discharge openings and covering the second discharge opening.

Fig. 6 is a similar view showing the combined agitating and discharge controlled device further moved to cover the first mentioned opening and to arrange a bottle for delivery through the second mentioned opening.

Fig. 7 is a similar view showing the combined agitating and discharge controlled device further moved to bring the bottle, illustrated in Fig. 6, over the discharge opening.

As disclosed by the drawings my improvement contemplates the employment of a suitable casing of any desired size and constructed of any desired material. The casing may be ornamented to add to the appearance thereof and is interiorly divided by horizontal and vertical partitions to provide a series of upper compartments 10, a series of intermediate compartments 11, and one or a series of lower compartments 12. Separate doors close all of the the compartments, the doors 13 and 14 for the upper and intermediate compartments being preferably arranged at the back of the casing 15, while the door for the lower compartments or compartments 12 may be arranged at the back or at one side of the casing. The doors are normally locked in closed position.

The upper compartments 10 are in the nature of refrigerating chambers, the lower walls of the said chambers being slatted as indicated by the numerals 16, and on these slats the blocks of ice 17 are arranged. Below the slats 16 is arranged the bottom proper for the respective compartments 10. This bottom, indicated by the numeral 18 is preferably constructed of metal, beveled downwardly in a transverse direction from the center and from the ends thereof, and the apexes or meeting points of the oppositely directed angle portions are provided with openings 19—19 that permit of the cold air from the refrigerating compartments entering the intermediate compartments 11 and that also provide means for directing the water from the melted ice into the said intermediate compartments 11. The bottom 18, it will be noted, thus provides two substantially V-shaped or trough-like connected members.

The number of compartments 10 and 11 are equal, and each of the compartments 11 is arranged directly below one of the refrigerating compartments 10.

On the sides at the bottom of each of the compartments 11 are oppositely disposed horizontally arranged strips in the nature of cleats 20. Resting on the cleats in the respective compartments 11 is a box-like case 21. The cases 21 are of a size to fully fill the compartments 11, but may be withdrawn from the said compartments through the openings closed by the doors 14. Each of the cases 21 is designed to receive therein transversely arranged horizontally disposed bottles 22 which are singly delivered therefrom by a novel means which will hereinafter be entered into in detail. The top of each of the cases 21 is open, but the bottom thereof is closed and the said bottom, indicated by the numeral 23 is provided with two spaced transverse openings 24 and 25 respectively. These openings are of a size to admit therethrough a single bottle 22. Above the openings 24 and 25 is a transversely arranged bottle directing plate 26. The ends of the plate 26 are arranged approximately in a line with the outer walls of the openings 25, so, strictly speaking, the plate 26 covers the said opening. The plate 26, upon its outer face is beveled from its center to its ends as indicated by the numeral 27, and these beveled surfaces are designed to direct the bottles 22 toward the ends of the casing in the direction of the respective openings 24 and 25. In addition to the bottle directing plate 26 each of the cases 21 has secured on its ends angle directing plates 28, the lower walls of which are arranged in a line with the straight lower wall of the central directing plate 26.

The side walls of each of the cases 21 between the directing plates 26, 28 and the cleats 20 are provided with longitudinally extending grooves or channels 29, and the said side walls of the case at the end thereof disposed next to the front of the casing has its side walls provided with widened depressions 30 that communicate with the grooves or channels 29, the front of each of the cases 21 being provided with an opening 31 that communicates with the said depressions 30, and in addition to this the front wall of the casing is provided with openings 32 arranged in a line with the openings 31.

Arranged for longitudinal movement in the channels or grooves 29 are slides 33. The slides are in the nature of rectangular plates and while concealed in the grooves or channels contact with only the lower walls thereof so that friction is thus reduced as much as possible. The slides 33 are of a less length than the cases 21 and likewise of a less length than the grooves or channels 29 including the widened portions 30 thereof. The slides 33, it will be noted are arranged in coöperating pairs in each of the cases 21, and the said slides, adjacent their ends are provided with elongated slots 34 and 35 respectively.

The slides 33 provide the side members of the combined bottle agitating and discharge controlled member of the device. Connecting each pair of slides 33, at equal distances from the center thereof are rods 36. Secured on these rods are spaced blocks 37. The blocks 37 have their upper faces, outward of their connection with the rods 36 beveled downwardly to their ends as indicated by the numerals 38. Bearing in the slots 34 and 35 are the ends of transversely arranged rods 39 and 40. These rods have connected thereto spaced block members 41 and 42 respectively. The block members 41 and 42 are disposed between the block members 37, and the outer ends of the series of blocks 41 and 42 are connected by rod members 43 and 44 respectively. The block members 41 and 42 have their upper faces from approximately the center thereof beveled downwardly toward their inner ends as indicated by the numerals 45 and 46 respectively. The inclined surfaces 45 and 46 are not arranged at as great a pitch or inclination as are the beveled or inclined ends 38 of the blocks 37, the latter terminating with the lower corners of the said blocks 37.

Pivotally secured, as at 47 to the ends of the slides 33 received in the widened portions 30 of the grooves 29, are links 48. These links 48 are connected by removable elements, such as pins or bolts 49 to the crank ends 50 of a shaft 51 that is journaled in suitable bearings 52 on the outer face of the casing 15. One of the cranks 50 (or if desired both of the cranks) of each of the shafts 51 is provided with an offset extension that forms an operating handle or lever 53.

Secured to the inner end of a transversely arranged board 54 that is connected between the cleats 20 in each of the compartments 19 is the inner end of an inclined chute 55. By reference to Fig. 2 of the drawings it will be seen that the inner edge of the board 54 is arranged in a line with the outer wall of the bottle delivery opening 25 in the bottom 23 of each of the cases 21. The outer face of the casing 15 is provided with an opening 56 that provides the bottle outlet for the chute 55, and each of the openings 56 is normally closed by a gravity influenced dog 57 that is hinged at its upper edge to the casing 15 as indicated by the numeral 58. On the outer face of the casing 15 is a transversely arranged receiving trough 59 for each of the delivery chutes 55. Each of the delivery chutes 55, preferably at or adjacent to the outer end thereof is provided with a transverse opening normally closed by a reticulated plate 60, and beneath each of the openings is a gutter 61 provided with an outlet pipe 62 that passes through the floor of the lower compartment 12 and which may have arranged therebelow a suitable drip pan to receive the water from the melted ice, it being apparent that such water dropping from the refrigerating compartments into the bottle containing compartments will flow between the spaced blocks that constitute the agitating and discharge control for the bottles, through the openings 24 and 25, onto the delivery chute 55. It will be further noted that the ice in the refrigerating compartments will cool all of the compartments.

When the filled bottles are to be arranged in the respective cases 21, the empty cases are drawn out of their respective compartments 11 through the openings closed by the doors 14. To permit of this the pivot members 49 are disconnected from the crank ends of the shafts 51, so that the agitating and discharge control members are removed with the cases. The filled cases are again arranged in the compartments 11 and the links 48 are again pivotally connected to the cranks 50. The directing plates 26 and 28 will have a tendency to cause the bottles to move toward the ends of the case 21, between the center and end directing plates. We will assume that the agitating and discharge controlling members of each of the cases 21 is in the position illustrated in Fig. 2 of the drawings, so that both of the discharge or outlet openings 24 and 25 are closed to the bottles. The central blocks 37 are positively connected to the slides 33, and consequently are at all times influenced by the movement of said slides. The end blocks 41 and 42 being, what may be termed loosely connected with the slides are only moved when the end walls provided by the slots 35 and 34 contact with the connecting rods 39 and 40 of the blocks. The rods 39 and 40 are arranged adjacent to the inner or confronting ends of the blocks 41 and 42, and the slots 34 and 35 are so arranged that when longitudinal movement is imparted to the slides, by the swinging of the handles or levers 53, the series of blocks will be unaffected when the slides are moved for almost the limit of their movement in one direction, while the remaining or central series of blocks will be moved with the slides. In Fig. 5 of the drawings the slides have been moved to their outward position and the inner series of blocks 43 have acted on one of the bottles 22 to project the same toward as well as permit of the same dropping through the delivery opening 25. The blocks, by the movement thereof agitate or stir up the bottles so that the proper ejection thereof will be assured under all conditions. The bottle in Fig. 5, to the left hand side of the said figure rests on one of the corners of the central blocks 37. The lever is now swung to move the slides and blocks to the position illustrated in Fig. 6. It will be noted that either of the end blocks 41 or 42 are as yet affected by the movement of the slides, only the central blocks 37 being moved with the slides. This movement of the central blocks permits of the bottle 22 being arranged between one of the ends thereof and the inner ends of the blocks 41. The handle or lever is now moved to the position illustrated in Fig. 7 of the drawings and the slide is moved farther inwardly of the casing. Such movement brings the central blocks 37 inward of the outlet opening 24 and over the outlet opening 25. The movement of the slides causes both of the rods 39 and 40 to be contacted by the end walls of the respective slots 34 and 35, thus moving both series of blocks, causing the blocks 41 to contact with the bottle 22 to move the same beneath the directing plate 26 and over the opening 24. The bottle gravitates onto the delivery chute 55 and rolls thereover into the delivery trough 59, the door 57, incident to the contact of the bottle therewith swinging to its open position. When the handle or lever 53 is swung in a reverse direction, or to its initial position the movement of the blocks constituting the bottle agitating and discharge member are reversed, causing the inner blocks 42 to move a bottle over the opening 25 and causing the central blocks 37 to cover the opening 24.

My improvement is adapted for use at any place where bottled goods are to be dispensed singly in a cool condition. The construction is simple but the operation thereof is positive. A bottle delivered to the trough 59 may be readily removed therefrom by the salesman or by the purchaser. Various articles of a perishable nature may be received in the compartment 12, and if desired also in the ice or refrigerating compartment 10. By providing a plurality of compartments various classes of bottled liquids may be independently dispensed, and the names indicating the character of such liquids may be inscribed on the outer panels of the upper compartments. By small changes or alterations the slides may be coin controlled, and it is also within the scope of the invention to provide mechanical means, such as a motor for actuating the slides and the elements associated therewith. The cases 21 are of a size sufficient to receive therein a comparatively great number of bottles, so that the refilling thereof will not be necessitated.

Having thus described the invention, what is claimed as new, is:—

1. In a bottle dispensing apparatus, a bottle agitating and discharge control member on which the bottles rest, and said member including a central series of spaced blocks and end series of spaced blocks, and said central series of blocks movable between the end series of blocks.

2. In a bottle dispensing apparatus, a slide, a combined bottle agitating and discharge control member connected to the slide and receiving bottles thereon, said member including a central series of blocks and end series of blocks, and said slide designed to positively move the central series of blocks therewith a predetermined distance before influencing the end series of blocks, whereby the central blocks will be received between one of the end series of blocks and positioned away from the adjacent series of end blocks.

3. In a bottle dispensing apparatus, a case having two spaced openings in the bottom thereof, a combined bottle agitating and discharge control member slidable over the bottom of the case and receiving the bottles thereon, said member comprising a plurality of sections, and the central section designed when the member is in one position to cover one of the openings in the case and to uncover the other opening, and one of the end members, when the central member is in its last mentioned position adapted to be brought in contact with a bottle to move the same over the uncovered opening.

4. In a bottle dispensing apparatus, a case, a central inverted V-shaped directing plate and angle end directing plates in the case, the bottom of the case having openings below the central directing plate, a longitudinally movable reciprocatory combined agitating and bottle control member on the bottom of the case below the directing plate, said member including a central section and end sections, and said central section when in one position designed to cover one of the openings and to uncover the other opening and to influence one of the end sections to bring a bottle over the uncovered opening, and operating means for said member.

5. In a bottle dispensing apparatus, a casing divided into a plurality of longitudinally arranged superimposed compartments, refrigerating means in the upper compartment, a bottle containing case in the central compartment, said case having its bottom provided with spaced openings, an inclined chute below said openings communicating with the front of the casing, a gravity influenced door closing the outlet for the chute, a receiving trough at the outer end of the chute, a combined agitating and discharge control member in the case on which the bottles rest, means on the center and at the end of the case for directing the bottles onto said member, said member comprising a plurality of sections formed of spaced blocks having the confronting ends thereof beveled and the central blocks when moved to one position designed to cover the openings in the case and when moved to another position to be received between the blocks of one of the end members and to influence the second end member to move the latter to a line with the opening adjacent thereto to eject a bottle through said opening.

6. In a bottle dispensing apparatus, a casing divided into a plurality of longitudinally arranged superimposed compartments, a slatted floor in the upper compartment, a W-shaped bottom between the slats having openings therethrough, slats on the sides of the intermediate compartment, a transverse board connecting said slats, an inclined chute secured to said board and communicating with an opening in the front of the casing, a gravity influenced hinged door closing said opening, a receiving trough at the end of the chute and the said chute having an opening therein, a gutter below the chute, an outlet pipe passing through the lower compartment and connected to the gutter, a bottle receiving case in the intermediate compartment having openings in the bottom thereof, a combined bottle agitating and discharge control member slidable in the case, directing members at the end and at the center of the case for directing the bottles onto the slidable member, said member comprising a plurality of sections, and means for operating the member whereby the central section is moved to cover one of the openings and to uncover the other opening in the case, and means connected to the said central section for influencing the end sections whereby to move one of the said end sections opposite the uncovered opening to discharge a bottle therethrough, and doors for the compartments.

In testimony whereof I affix my signature.

FRANK F. GILLIAM.